March 7, 1950 W. A. MUELLER 2,499,603
RERECORDING METHOD AND SYSTEM
Filed Oct. 23, 1945
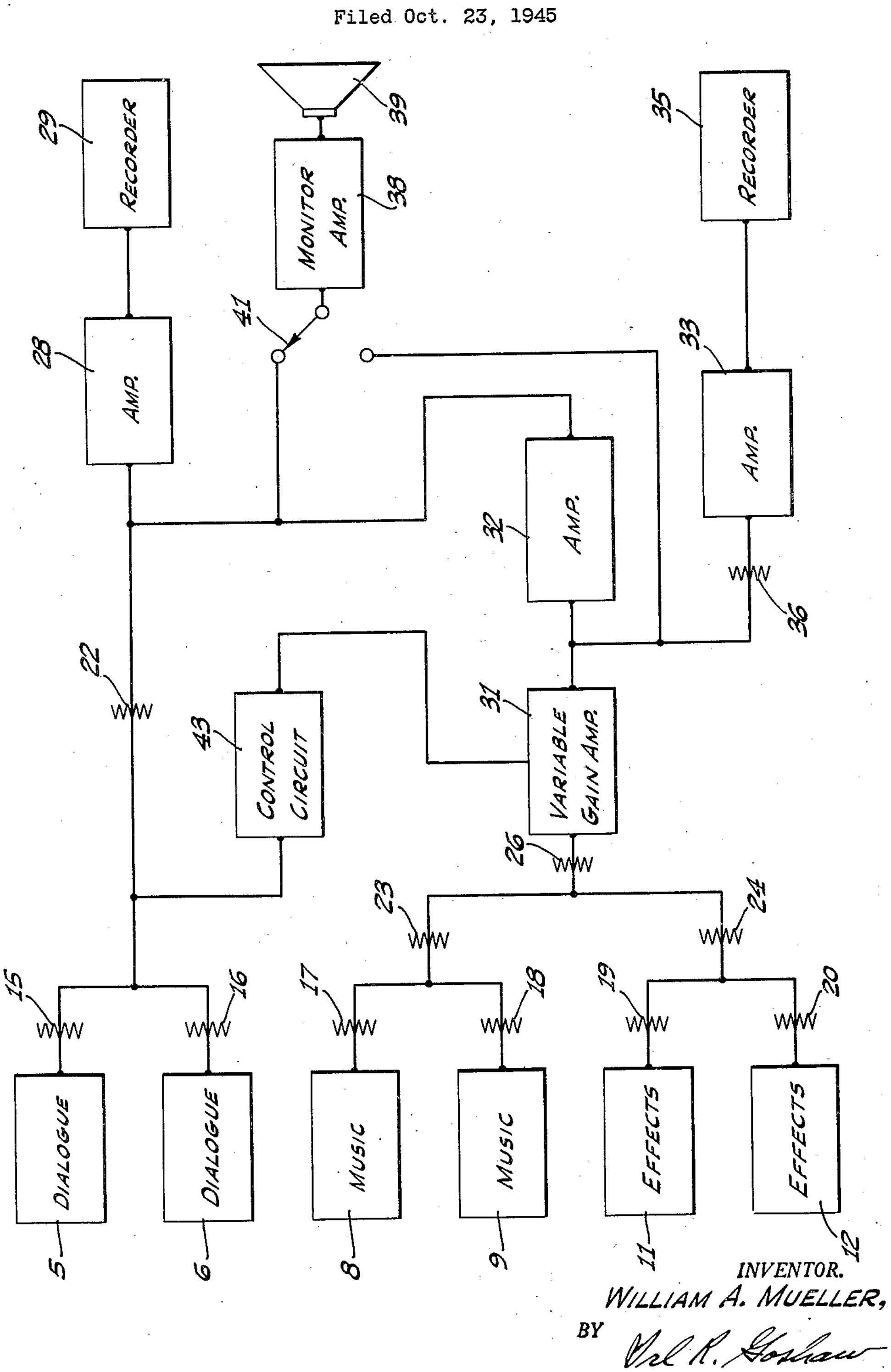
INVENTOR.
WILLIAM A. MUELLER,
BY Vel R. Goshaw
ATTORNEY.

Patented Mar. 7, 1950 2,499,603

UNITED STATES PATENT OFFICE 2,499,603

RERECORDING METHOD AND SYSTEM

William A. Mueller, Los Angeles, Calif., assignor to Radio Corporation of America, a corporation of Delaware Application October 23, 1945, Serial No. 623,935

7 Claims. (Cl. 179—100.1)

This invention relates to apparatus for making sound records, and particularly to a plural rerecording method and system whereby two types of sound tracks are produced simultaneously.

In the normal rerecording system, a plurality of reproducers generate electrical currents corresponding to dialogue, music, or incidental sound effects, such as hoof beats, thunder, crowd noises, etc. Certain of these currents are mixed at different times into a composite signal which is recorded for later combination on a picture print. In the mixing of the sounds, the operator individually controls the amplitude of the different currents during transmission or rerecording so that the proper balance is obtained to enhance the dramatic effect of the story being told by the picture.

Various automatic volume controls are also incorporated in present-day rerecording systems. One such control is a circuit interconnecting the output of the reproducers generating dialogue currents and a variable gain amplifier for the reproducers generating the background currents, this interconnecting circuit automatically reducing the level of the background effect currents during the transmission of the dialogue currents. Such a circuit improves the intelligibility of the dialogue by preventing its being masked out by the background sounds. My Patents No. 1,888,467 of November 22, 1932, and No. 2,075,861 of April 6, 1937, disclose and claim such an automatic background regulating system. It is well-known that various other automatic circuits, such as compressors, are also used.

The present invention is directed to a rerecording system in which not only is it possible to make the normal composite rerecorded sound record, but also to simultaneously make a sound record which is a duplicate of the normal sound record except for the dialogue component. That is, the second record will have all the variations and discrepancies in amplitude levels between the various background music and other effects, but will be minus the dialogue, such a track sometimes being called a "minus-dialogue" track or record. The purpose for making such a record is to permit the insertion or substitution, at a later date, of a foreign dialogue component for the original dialogue for use in foreign countries having a language different from the language originally recorded.

In the past, such a minus-dialogue track was made after it was determined that it was desirable to make the picture for foreign release. It was then necessary to re-assemble the original component records including the dialogue and to mix the various components in the same manner as though a composite record in the original language was to be made. During this rerecording operation, it was, and still is in many instances, common practice to notch the dialogue film or control film to control the dialogue input to the recorder to prevent the recording of the dialogue with the other sounds, although the dialogue is reproduced in the monitor to permit the mixers to obtain the proper rerecording level of the background sounds with respect to the dialogue on the minus-dialogue track.

The present invention avoids this prior procedure by making the minus-dialogue record simultaneously with the recording of the original language composite record. In this manner, not only are duplicate rerecording operations eliminated, but it has been found that a better balanced minus-dialogue track is obtainable when the rerecording is first done, as more care is given to the rerecording operation at that time.

The principal object of the invention, therefore, is to facilitate the rerecording of different forms or types of sound records to accompany motion pictures.

Another object of the invention is to provide an improved rerecording method for producing a sound track which has all the component parts except the dialogue.

A further object of the invention is to provide an improved system of producing a plurality of sound records differing by the absence of dialogue in one of the records.

A still further object of the invention is to provide an improved method of and system for obtaining the proper amplitude level of various background sounds with respect to accompanying dialogue which is recorded with the other sounds as one record and which is not recorded with the other sounds as a second record.

Although the novel features which are believed to be characteristic of this invention will be pointed out with particularity in the appended claims, the manner of its organization and the mode of its operation will be better understood by referring to the following description read in conjunction with the accompanying drawing, forming a part hereof, in which the single figure is a block diagram of the rerecording system embodying the invention.

Referring now to the drawing, along the left-hand side are two blocks identified as 5 and 6, which represent sound reproducers of dialogue records; two blocks 8 and 9, which represent sound reproducers of music records; and two blocks 11 and 12, which represent sound reproducers of sound effects. It is realized that only one dialogue, one music, and one effect reproducer may be operated at the same time, or any other combination of these reproducers. Furthermore, additional reproducers may be used in case the number shown is insufficient to furnish the various types of effects or music called for by the picture at different points in a roll of film. The output of each individual reproducer may be controlled by potentiometers indicated at 15 to 20, inclusive, while the combined output of the dialogue reproducers may be controlled by a potentiometer 22, the combined output from music reproducers controlled by potentiometer 23, and the combined output from the effects reproducers by potentiometer 24. The combined signal from all the music and effects reproducers may be simultaneously controlled by potentiometer 26.

The output of the dialogue reproducers is fed directly to an amplifier 28 and then to a recorder 29, which is to record all the components of the final record. The output of the music and effects reproducers is fed into a variable gain amplifier 31, which, in turn, feeds an amplifier 32, connected to the input of amplifier 28. An amplifier 33, also connected to the output of variable gain amplifier 31, feeds a second recorder 35, the input to amplifier 33 being controlled by a potentiometer 36. A monitor amplifier 38 with its associated speaker 39 may be connected either to the output of amplifier 32, by throwing a switch 41 to its upper position, or to the output of variable gain amplifier 31, by throwing the switch to its lower position, as indicated in the drawing.

Interconnecting the output of the dialogue reproducers 5 and 6 and the variable gain amplifier 31, is a control circuit 43, the details of which are disclosed and claimed in my above-mentioned patents. Briefly, the control circuit reduces the gain of the variable gain amplifier 31 during reproduction of the dialogue so that the level of the background sounds is reduced to a point where they do not interfere with the intelligibility of the dialogue.

In the operation of the above-described system, the reproducers are operated in their normal manner and the various potentiometers are adjusted by the mixers in the normal way to produce the normal combined record at the recorder 29. Simultaneously with this operation, the output of the variable gain amplifier, which contains the output of the music and sound effects, is balanced with respect to the dialogue not only manually by potentiometers 17, 18, 19, 20, 23, 24, and 26, but also automatically by the control circuit 43. This output is impressed on the amplifier 33 and then impressed on the recorder 35. It is realized that the input to amplifier 33 and recorder 35 is minus the output of the dialogue reproducers 5 and 6.

Thus, the relationship or balance between the level of the music and the level or levels of the sound effects with respect to each other and to the dialogue will be the same as recorded at 35 without the dialogue as when recorded at 29 with the dialogue. It is only necessary, therefore, in order to add the dialogue in a foreign language, to rerecord the record made on the recorder 35 and add thereto the foreign dialogue at the proper points on the record.

I claim:

1. A sound recording system comprising at least one dialogue reproducer and a plurality of background sound reproducers, a first recorder connected to said dialogue reproducer, means connected to said background reproducers for controlling the level of the signals produced thereby, means for controlling said level controlling means in accordance with the output energy of said dialogue reproducer, a second recorder connected to the output side of said level controlling means, and an amplifier connected between the output side of said level controlling means and said first recorder to supply the controlled background signals to said first recorder.

2. A method of sound recording comprising producing signals representative of dialogue, producing signals representative of background sound effects, variably controlling the background signals in accordance with the dialogue signals, recording said variably controlled background signals, additionally combining said variably controlled back ground signal with said dialogue signals, and recording said combined signals simultaneously with and separately from said recorded variably controlled background signals.

3. The method of recording a sound record of only a background sound effects signal simultaneously with the recording of the combination of a dialogue signal and said background sound effects signal, comprising producing electrical currents corresponding to a dialogue signal, producing electrical currents corresponding to a background sound effects signal, variably controlling the background signal currents in accordance with the dialogue signal currents, recording said variably controlled background signal currents, combining said variably controlled background signal currents and said dialogue signal currents, and simultaneously recording said combined dialogue and background signal currents separately from the recording of said variably controlled background signal currents.

4. The method of recording in accordance with claim 3, in which the respective levels of said electrical currents corresponding to both dialogue and background signals are independently adjusted before said background signal currents are variably controlled and combined with said dialogue signal currents.

5. A method of sound recording comprising producing a certain type of signal, producing a second type of signal, variably controlling said second type of signal in accordance with said first type of signal, recording said variably controlled second type of signal, additionally combining said variably controlled second type of signal with said first type of signal, and recording said combined signals simultaneously with and separately from said recorded variably controlled second type of signal.

6. A recording system, comprising a plurality of sound reproducers, at least one of said reproducers reproducing a first type of signal and the other reproducers reproducing a second type of signal, a first recorder connected to said reproducer of said first type of signal, means connected to said other reproducers for controlling the level of the signal produced thereby, means for controlling said level controlling means in accordance with the output energy of said reproducer reproducing said first type of signal, a second recorder connected to the output side of said level controlling means, and an amplifier connected between the output side of said level controlling means and said first recorder to supply the controlled second type of signal to said first recorder.

7. A recording system in accordance with claim 6, in which means individual to each of said plurality of sound reproducers are provided to individually control the output level from each of said reproducers.

WILLIAM A. MUELLER.

REFERENCES CITED

The following references are of record in the file of this patent:

UNITED STATES PATENTS

| Number | Name | Date |
|---|---|---|
| 2,075,861 | Mueller | Apr. 6, 1937 |
| 2,341,303 | Wolff | Feb. 8, 1944 |
| 2,342,395 | Frayne | Feb. 22, 1944 |
| 2,402,095 | Slyfield | June 11, 1946 |